United States Patent
Milliken et al.

(10) Patent No.: US 9,683,107 B2
(45) Date of Patent: Jun. 20, 2017

(54) COPPER OXIDE INFRARED PIGMENT

(71) Applicant: Ferro Corporation, Mayfield Heights, OH (US)

(72) Inventors: Elena D. Milliken, Bethel Park, PA (US); Terry J. Detrie, Washington, PA (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 15/300,821

(22) PCT Filed: Mar. 19, 2015

(86) PCT No.: PCT/US2015/021373
§ 371 (c)(1),
(2) Date: Sep. 30, 2016

(87) PCT Pub. No.: WO2015/153129
PCT Pub. Date: Oct. 8, 2015

(65) Prior Publication Data
US 2017/0015836 A1    Jan. 19, 2017

Related U.S. Application Data

(60) Provisional application No. 61/974,017, filed on Apr. 2, 2014.

(51) Int. Cl.
| | |
|---|---|
| *C09D 5/00* | (2006.01) |
| *C09D 5/33* | (2006.01) |
| *B82Y 30/00* | (2011.01) |
| *C09C 1/00* | (2006.01) |
| *C09D 5/32* | (2006.01) |
| *C09D 7/12* | (2006.01) |
| *C01G 3/02* | (2006.01) |
| *C09C 3/04* | (2006.01) |
| *C09D 17/00* | (2006.01) |
| *C08K 3/22* | (2006.01) |

(52) U.S. Cl.
CPC ............ *C09D 5/004* (2013.01); *B82Y 30/00* (2013.01); *C01G 3/02* (2013.01); *C08K 3/22* (2013.01); *C09C 1/00* (2013.01); *C09C 3/041* (2013.01); *C09C 3/043* (2013.01); *C09D 5/32* (2013.01); *C09D 7/1216* (2013.01); *C09D 7/1266* (2013.01); *C09D 17/007* (2013.01); *C01P 2002/60* (2013.01); *C01P 2004/51* (2013.01); *C01P 2004/61* (2013.01); *C01P 2004/62* (2013.01); *C01P 2006/12* (2013.01); *C01P 2006/62* (2013.01); *C08K 2003/2248* (2013.01); *C08K 2201/003* (2013.01); *C08K 2201/005* (2013.01); *C08K 2201/006* (2013.01)

(58) Field of Classification Search
CPC ........... C09C 1/00; C09C 3/041; C09C 3/043; C09D 5/004; C09D 5/32; C09D 7/12616; C09D 7/1266; C09D 17/007; C08K 3/22; C08K 2003/2248; C08K 2201/003; C08K 2201/005; C08K 2201/006; C01P 2004/51; C01P 2004/61; C01P 2004/62; C01P 2006/12; C01P 2006/60

See application file for complete search history.

(56) References Cited

U.S. PATENT DOCUMENTS

| | | |
|---|---|---|
| 3,216,954 A | 11/1965 | Howk et al. |
| 4,075,029 A | 2/1978 | Nuss |
| 4,159,207 A | 6/1979 | Nuss |
| 4,202,702 A | 5/1980 | Nuss |
| 4,289,745 A | 9/1981 | Patil |
| 5,219,807 A | 6/1993 | Pavlica et al. |
| 5,501,733 A | 3/1996 | Macaudiere et al. |
| 6,171,383 B1 | 1/2001 | Sakoske et al. |
| 6,174,360 B1 | 1/2001 | Sliwinski et al. |
| 6,221,147 B1 | 4/2001 | Sakoske et al. |
| 6,416,868 B1 | 7/2002 | Sullivan et al. |
| 6,464,772 B1 | 10/2002 | Vermoortele et al. |
| 6,485,557 B1 | 11/2002 | Swiler |
| 6,503,316 B1 | 1/2003 | Sakoske et al. |
| 6,541,112 B1 | 4/2003 | Swiler et al. |
| 6,582,814 B2 | 6/2003 | Swiler et al. |
| 6,680,121 B2 | 1/2004 | Sakoske et al. |
| 7,014,701 B2 | 3/2006 | Stewart et al. |
| 7,060,126 B2 | 6/2006 | Andes et al. |
| 7,264,670 B2 | 9/2007 | Rüger et al. |
| 8,006,909 B2 | 8/2011 | Swiler et al. |
| 8,172,935 B2 | 5/2012 | Swiler et al. |
| 8,580,028 B2 | 11/2013 | Nuccetelli et al. |
| 8,946,102 B2 | 2/2015 | Axtell, III et al. |
| 9,096,442 B2 | 8/2015 | White et al. |
| 9,187,617 B1 | 11/2015 | Letschert et al. |
| 9,211,587 B2 * | 12/2015 | Kaneshiro ............... C01G 3/02 |
| 9,238,735 B2 | 1/2016 | Wang |
| 2009/0087674 A1 | 4/2009 | Slawikowski et al. |
| 2011/0172085 A1 * | 7/2011 | Wolk .................. B01J 35/0013 502/84 |

FOREIGN PATENT DOCUMENTS

| | | |
|---|---|---|
| JP | 2011-57501 | 3/2011 |
| JP | 2012-201515 | 10/2012 |
| WO | 97/31054 | 8/1997 |
| WO | 2010/030518 A1 | 3/2010 |

OTHER PUBLICATIONS

Espacenet bibliographic data for JP2012201515 published Oct. 22, 2012, one page.
Espacenet bibliographic data for JP2011057501 published Mar. 24, 2011, two pages.
International Search Report for corresponding PCT/US2015/021373 mailed Jun. 25, 2015, one page.

* cited by examiner

Primary Examiner — Anthony J Green
(74) *Attorney, Agent, or Firm* — Rankin, Hill & Clark LLP

(57) ABSTRACT

Copper oxide particles having particular starting size and surface area characteristics can be processed by heat and milling to achieve sizes and particle size distributions that give the copper oxide properties as an infrared reflective pigment without addition of other metals or oxides.

22 Claims, 4 Drawing Sheets

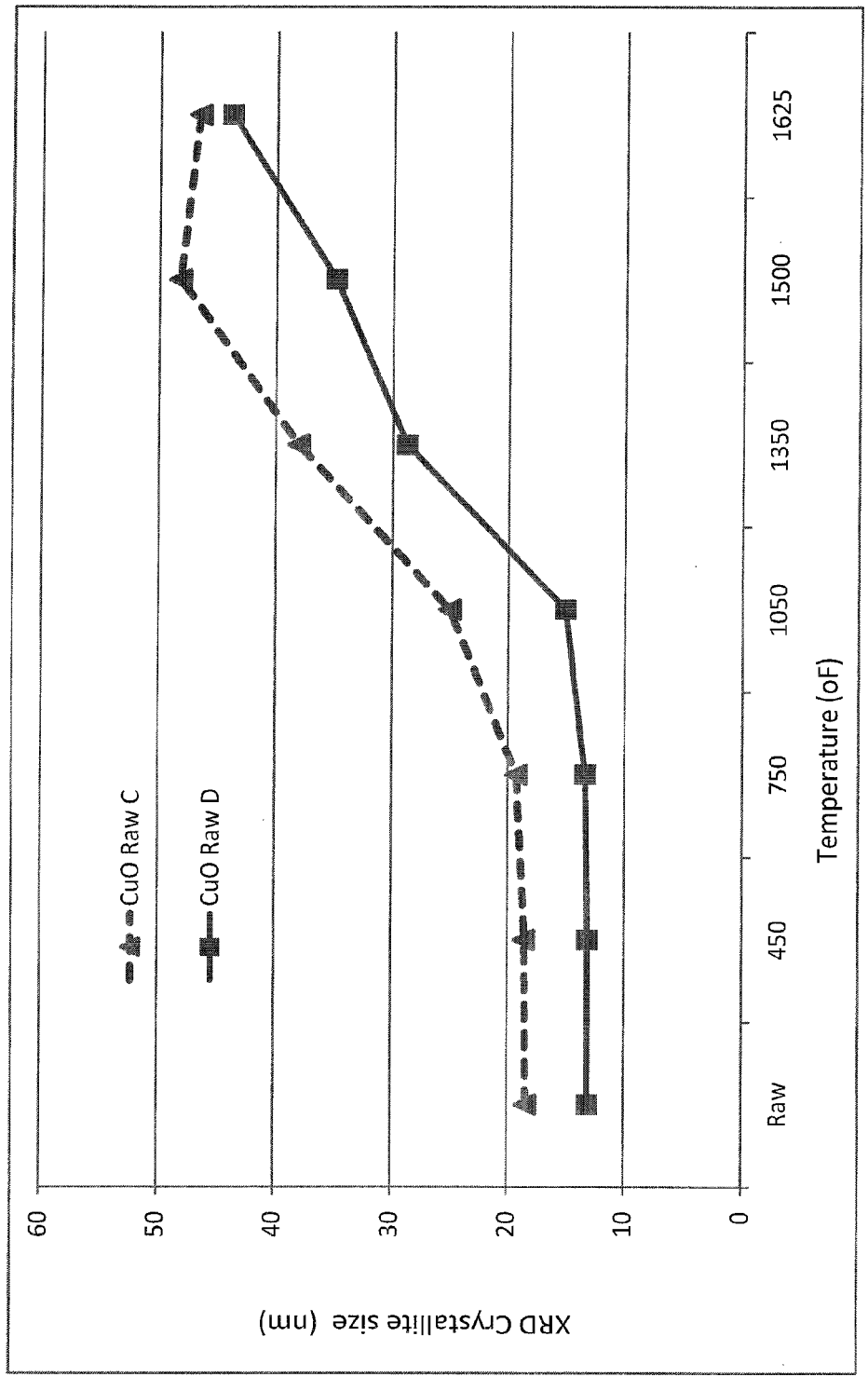
Figure 1. Crystallite sizes of Two Different Copper Oxide particles (CuO Raw C and CuO Raw D), both untreated, and heat treated at selected values from 450 °F to 1625 °F.

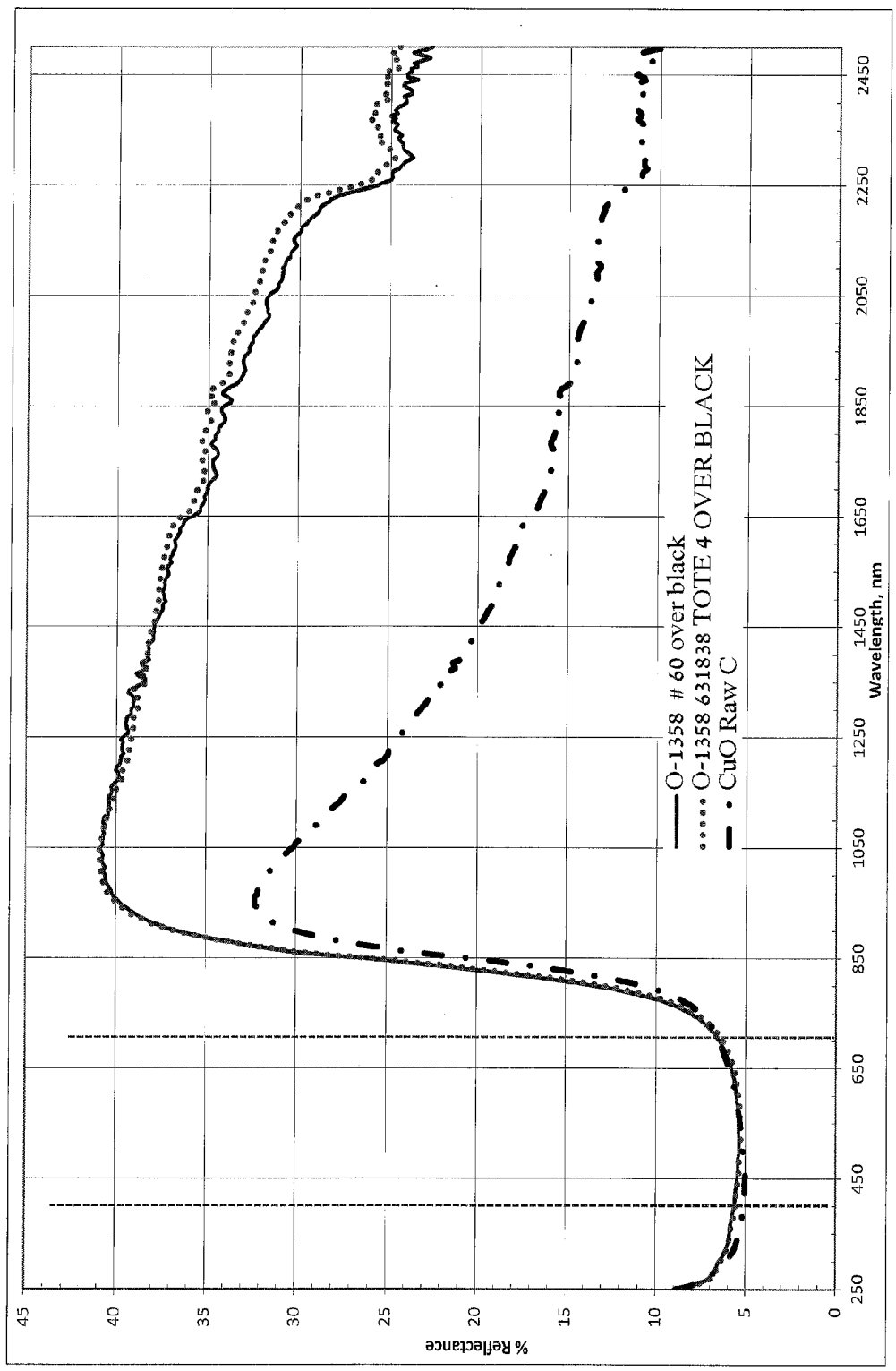
Figure 2. Infrared Spectrum of Raw and Processed Copper Oxide pigments in accordance with the invention.

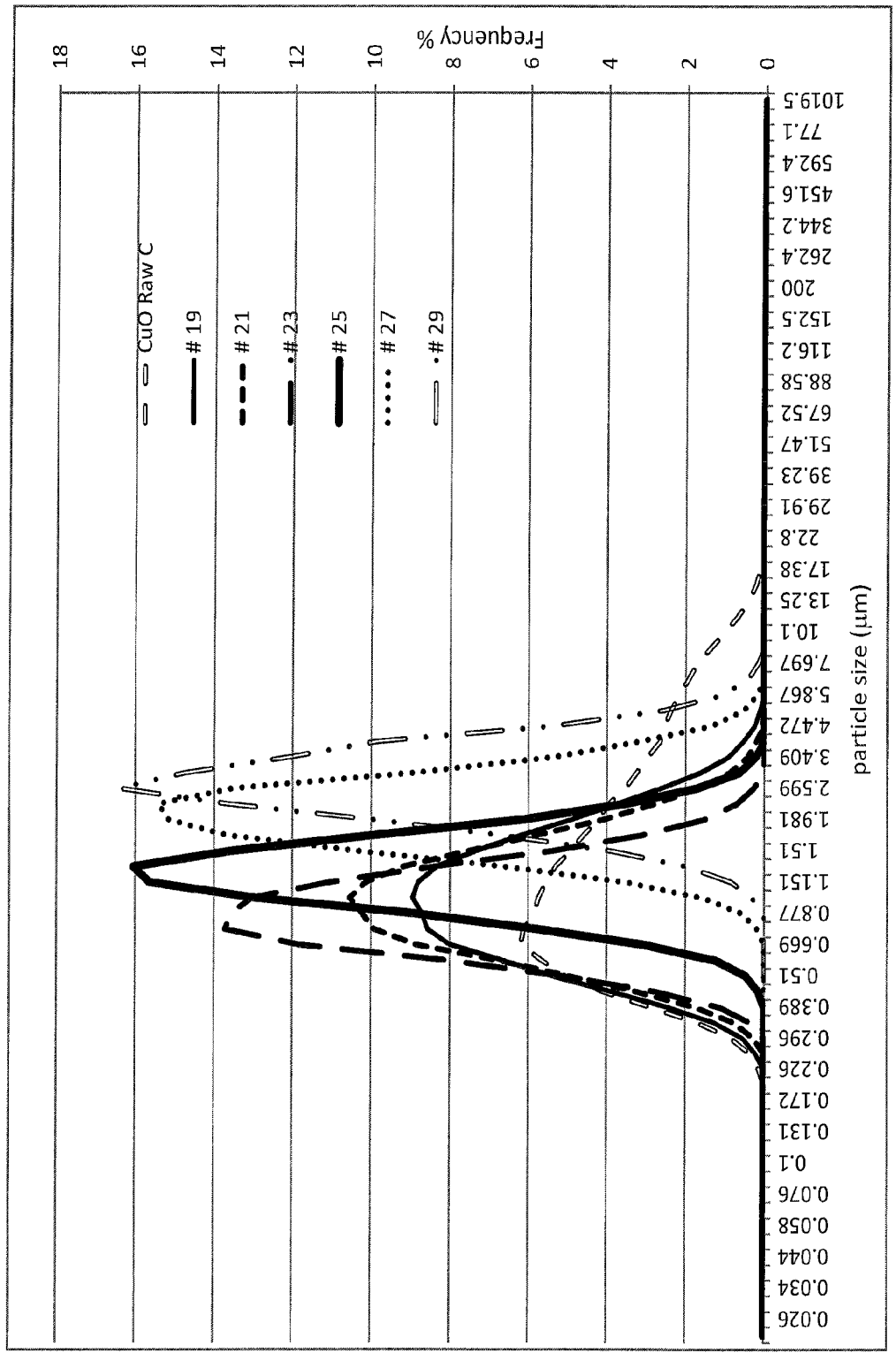
Figure 3. Particle size distribution of powders heat treated at various temperatures

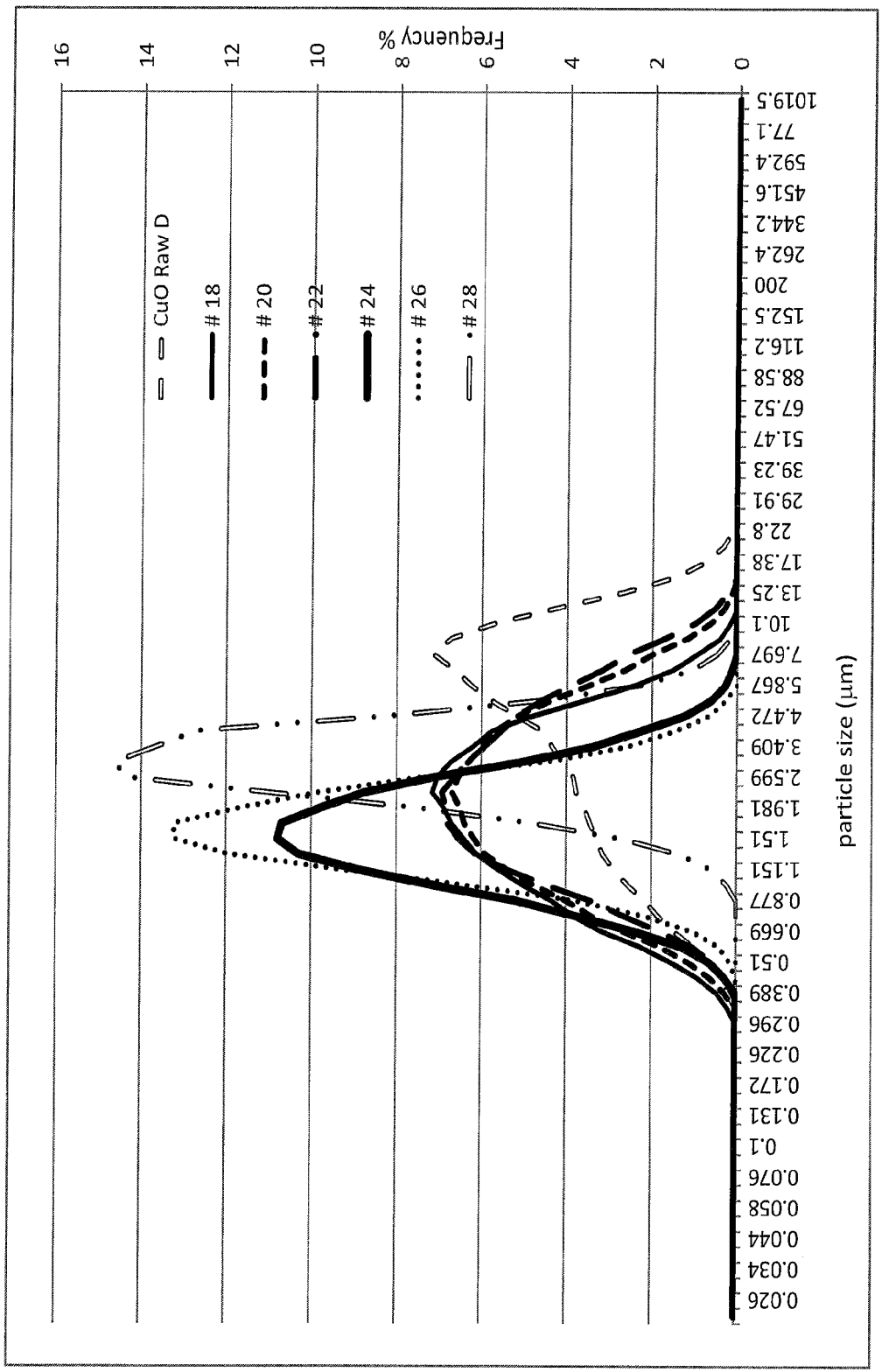
Figure 4. Particle size distribution of powders heat treated at various temperatures

COPPER OXIDE INFRARED PIGMENT

BACKGROUND OF THE INVENTION

1. Field of Invention

The subject disclosure generally relates to pigment compositions and method of making pigment compositions.

This invention relates to a method for producing dark-tone IR reflective pigment based on Cupric Oxide (CuO) powders, through physical alteration, without chemical modification. After processing, the powder is in polycrystalline form and contains at least 99% CuO and under 1% impurities pertaining to the raw material. The processed CuO powder is a high quality pigment with improved TSR (total solar reflectance) and strength compared to the initial raw material.

2. Description of Related Art

Pigments are widely used in various applications such as paints, inks, plastics, rubbers, ceramics, enamels, and glasses. There are various reasons for using inorganic pigments. Among these are the coloristic properties of the pigments, their visible as well as ultraviolet (UV) and infrared (IR) reflectance characteristics, their light fastness and their high temperature stability. The high temperature stability is necessary when the objects being colored are produced at elevated temperatures.

Pigments exhibit certain colors because they selectively reflect and absorb certain wavelengths of light. White light is an approximately equal mixture of the entire visible spectrum of light. When white light encounters a colored pigment, some wavelengths are absorbed as they interact with the electronic structure of the pigment. These interactions are determined by the chemistry and crystal structure of the pigment. The wavelengths not absorbed are reflected back to the observer, and this reflected visible light spectrum creates the appearance of a color. For example, ultramarine reflects blue light, typically between 400 and 500 nanometers in wavelength, and absorbs visible light of other wavelengths.

The appearance of pigments is also dependent upon the spectrum of the source light. Sunlight has a high color temperature and a fairly uniform spectrum, and is considered a standard for white light. Artificial light sources, including fluorescent light, tend to have great peaks in some regions of their spectrum, and deep valleys in other regions. Viewed under these conditions, pigments may exhibit different colors.

A large number complex inorganic color pigments (CICPs) are copper-containing pigments. Examples of copper-containing blacks include C.I. Pigments, Black 26, Black 27, Black 28, and Black 30. All of these blacks have spinel crystal structure. Copper chromite blacks (C.I. Pigments Black 28) are spinels made from copper (II) oxide and chromium (III) oxide green, with a general formula of $CuCr_2O_4$. Copper chromites are the most widely used CICP blacks. The copper chromite blacks are general-purpose pigments with durability and temperature resistance. Copper chromite blacks generally provide dark-tone color as well as strong absorption in near IR region. The copper chromite blacks are excellent UV absorbers, and offer good UV opacity to the systems that employ them. Red-colored cuprous oxide ($Cu_2O$) is commonly used as a pigment, a fungicide, and an antifouling agent for marine paints. The black CuO is used as a pigment in ceramics to produce blue, red, and green (and sometimes gray, pink, or black) glazes.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Copper oxide powders can be produced by a variety of methods and in a variety of morphologies at the lab scale. Two major trends become distinct in synthesis of powders with controlled particle size: bottom-up approach—where particle are grown to the desired size usually from a solution phase, and top-down approach—where large particles are milled to a smaller size. In the bottom-up approach, a variety of methods are established already at the lab-scale such as, for example, sol-gel, hydrothermal, flame spray pyrolysis, and thermal decomposition/oxidation among others. However, the foregoing procedures are not used often in industrial or large scale production, with precipitation being the most common.

Recycling of copper from wastewaters resulting from circuit board printing is becoming an important industrial method of CuO synthesis. The resulting CuO powders have been found to be suitable as raw materials in the synthesis of high-temperature superconductors, materials with giant magnetoresistance, magnetic storage media, catalysts, pigments, gas sensors, p-type semiconductor, and cathode materials, among others.

The inventors investigated various commercially available CuO powders and found that none could be used as a pigment as received. The inventors found that such powders are composed either of strongly agglomerated ultrafine particles or large particles, in both cases having broad particle size distribution and unattractive coloristic properties. The main characteristics of a pigment are specific coloristic properties, uniform particles with median ($D_{50}$) particle size of 0.3-3 microns and narrow particle size distribution, quantified by a span $\Delta D$ usually between 0.7-3.0 or 0.8-1.4, to render a strong pigment. In many new applications, the major desired characteristic is infrared reflectance, in addition to protective and aesthetic properties. The reflectance becomes sensitive to the particle size for moderate or high absorbing systems. Therefore one can tailor the particle size to maximize the reflectance of absorbing powders.

The pigment developed by the inventors herein contains at least 99% CuO, the remaining being raw material impurities. In a preferred embodiment, no intentional additions of other metals or oxides are added. Various sources of copper compounds, including, but not limited to, copper (II) carbonate, copper (II) hydroxide, copper (II) acetate, copper (I) oxide, and others, can be used to obtain the invention pigment. Ultrafine CuO, the raw material of this pigment, is physically altered, without any chemical modification, through a combined bottom-up—top-down approach. The bottom-up approach takes advantage of the initial stage of sintering. When ultrafine particles, with high surface area, are exposed to the heat action, they reduce their free energy by inter-particle penetration, followed by smoothing of the particle surface and subsequent decrease in surface area. The sintering process can be stopped when the particles reach the desired particle size. By a top-down approach, the powder is then milled to break some of the agglomerates formed during sintering or already exist in the raw material. The resulting powder can be used as a dark tone pigment with a TSR over black of about 20% or higher.

An embodiment of the invention is method of preparing an infrared reflective copper oxide pigment, comprising: (a)

providing starting copper oxide particles that are at least 99% pure CuO and have the following characteristics: (i) $D_{10}$ particle size of 0.25-2 microns, (ii) $D_{50}$ particle size of 0.5-6 microns, (iii) $D_{90}$ particle size of 1-30 microns, (iv) span $\Delta D$ of 1-12, and (v) SSA of 5-50 $m^2/g$, (b) heating the copper oxide particles at a temperature of 900° F. to 1600° F., for a time of 1-1000 minutes, (c) milling the copper oxide particles sufficiently to achieve at least one characteristic selected from the group consisting of: (i) $D_{10}$ particle size of 0.3-2 microns, (ii) $D_{50}$ particle size of 0.6-3 microns, (iii) $D_{90}$ particle size of 0.9-5 microns, (iv) span $\Delta D$ 0.7-30 and (v) SSA of 2-10 $m^2/g$.

An embodiment of the invention is a method of preparing an infrared reflective copper oxide pigment, comprising: (a) providing starting copper oxide particles that are at least 99% pure CuO and have the following characteristics: (i) $D_{10}$ particle size of 0.4-1.2 microns, (ii) $D_{50}$ particle size of 0.9-5.1 microns, (iii) $D_{90}$ particle size of 2-22 microns, (iv) span $\Delta D$ of 1.6-8.8, and (v) SSA of 22-39 $m^2/g$, (b) heating the copper oxide particles at a temperature of 1100° F. to 1500° F., for a time of 20-120 minutes, (c) milling the copper oxide particles sufficiently to achieve at least one characteristic selected from the group consisting of: (i) $D_{10}$ particle size of 0.5-0.9 microns, (ii) $D_{50}$ particle size of 0.8-1.5 microns, (iii) $D_{90}$ particle size of 1.3-2.8 microns, (iv) span $\Delta D$ of 0.9-1.4 and (v) SSA of 1-10 $m^2/g$.

An embodiment of the invention is a paint or coating including a copper oxide pigment made by any method disclosed elsewhere herein.

An embodiment of the invention is a plastic composition including a copper oxide pigment made by any method disclosed elsewhere herein.

Embodiments of the invention are a roofing shingle, roofing granule, or roofing composition, any of which includes a copper oxide pigment made by any method disclosed elsewhere herein.

An embodiment of the invention is a paint or coating including any copper oxide pigment disclosed elsewhere herein.

An embodiment of the invention is a plastic composition including any copper oxide pigment disclosed elsewhere herein.

Embodiments of the invention are a roofing shingle, roofing granule, or roofing composition, any of which includes a copper oxide pigment disclosed elsewhere herein.

An embodiment of the invention is a copper oxide pigment having the following characteristics: (a) $D_{10}$ particle size of 0.3-2 microns, (b) $D_{50}$ particle size of 0.6-3 microns, (c) $D_{90}$ particle size of 0.9-5 microns, (d) span $\Delta D$ of 0.7-3.0, and (e) SSA of 2-10 $m^2/g$.

An embodiment of the invention is a paint or coating or plastic composition including any copper oxide pigment disclosed elsewhere herein.

An embodiment of the invention is a method of preparing an infrared reflective copper oxide pigment, comprising: (a) providing starting copper oxide particles, (b) heating the copper oxide particles at a temperature of 900° F. to 1500° F., (c) milling the copper oxide particles sufficiently to achieve at least one characteristic selected from the group consisting of: (i) $D_{10}$ particle size of 0.5-1.25 microns, (ii) $D_{50}$ particle size of 0.75-1.5 microns, (iii) $D_{90}$ particle size of 1-10 microns, and (iv) SSA of 1-5 $m^2/g$.

Another embodiment of the invention is a method of preparing an infrared active copper oxide pigment, comprising: (a) providing at least 99 wt % pure copper oxide particles containing no intentional additions of any metal with which copper may form a mixed metal oxide, the particles having a specific surface area of 15-50 $m^2/g$, (b) heating the copper oxide particles, for a time of 1 to 250 minutes, to at least one of (i) a furnace set temperature of 900° F. to 1500° F., and (ii) a copper oxide particle temperature of 1100-1300° F., (c) milling the copper oxide particles sufficiently to form finished copper oxide particles and to achieve at least one characteristic selected from the group consisting of: (i) $D_{10}$ particle size of 0.5-1.25 microns, (ii) $D_{50}$ particle size of 0.75-1.5 microns, (iii) $D_{90}$ particle size of 1-10 microns, and (iv) SSA of 1-5 $m^2/g$, wherein the finished copper oxide particles exhibit a total solar reflectance over black of at least 17%, preferably at least 20%.

Still another embodiment of the invention is a method of preparing an infrared reflective copper oxide pigment comprising (a) providing at least 99 wt % pure copper oxide particles containing no intentional additions of any metal with which copper may form a mixed metal oxide, the particles having a specific surface area of 15-50 $m^2/g$, (b) heating the copper oxide particles for at least one combination of time and temperature selected from the group consisting of (i) 1000-1100° F. for 30-150 minutes, (ii) 1100-1200° F. for 25-90 minutes, (iii) 1200-1300° F. for 20-75 minutes and (iv) 1300-1400° F. for 15-60 minutes, and (c) milling the copper oxide particles in a wet mill with zirconia beads for a time of 1-300 minutes.

In any method embodiment herein, the starting copper oxide can particles are provided by heat treatment of at least one copper compound wherein copper is in the +1 or +2 oxidation state and decomposes or oxidizes upon heating to copper (II) oxide. Examples of such copper compounds include copper (II) carbonate, copper (II) hydroxide, copper (II) acetate, copper (I) oxide, and combinations thereof. Others will be readily evident to the skilled artisan. In a preferred embodiment, the at least one copper compound includes copper (II) carbonate and copper(II) hydroxide. In a more preferred embodiment, the copper (II) carbonate and copper(II) hydroxide are present in a 1:1 mole ratio, although ratios from 100:1 to 1:100 are envisioned, and all in between.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention can be employed. Other objects, advantages and novel features of the invention will become apparent from the following detailed description of the invention when considered in conjunction with the drawings.

BRIEF DESCRIPTION OF THE DRAWINGS

FIG. 1 is a graphical representation of Crystallite sizes of Two Different Copper Oxide particles (CuO Raw C and CuO Raw D), both untreated, and heat treated at selected values from 450° F. to 1625° F.

FIG. 2 is an Infrared Spectrum of Raw and Processed Copper Oxide pigments in accordance with the invention.

FIG. 3 is a Particle size distribution of powders heat treated at various temperatures.

FIG. 4 is a Particle size distribution of powders heat treated at various temperatures

DETAILED DESCRIPTION OF THE INVENTION

The subject pigment compositions can exhibit improved solar reflectance properties such that the pigment compositions reflect a relatively high proportion of light having a wavelength between 780 and 2500 nm (i.e., the infrared spectrum), while reflecting a relatively low proportion of light having a wavelength between 380 and 780 nm (i.e., the visible spectrum), which shows either light-tone or dark-tone colors. These unique reflection characteristics enable the preferred pigment compositions to selectively reflect infrared (IR) radiation while not significantly reflecting light within the visible spectrum. Thus, the pigment compositions maintain their desired appearance and color, e.g., dark-tone color, black color, or light-tone color, while also reflecting significant amounts of IR radiation.

The subject pigment compositions can include copper oxides. The starting copper oxides can include copper (I) oxide and copper (II) oxide or can potentially be any copper compound, with copper being in the oxidation state +2 or +1, such as, for example, (copper (II) carbonate, copper (II) hydroxide, copper (II) acetate, copper (I) oxide, etc.) that through thermal decomposition/oxidation yields copper (II) oxide. The final product pigment contains only copper (II) oxide. It is possible to heat the copper oxide particles under reducing conditions to produce some copper (I) oxide in the final particles, however this is not preferred.

The characteristics of the raw materials and the pigments of the invention are determined using the following methods, instrumentations, sample preparation and calculations: Particle size distributions are measured with Horiba LA-910 Particle Size Analyzer. Prior to measurements, a slurry containing the powder to be analyzed is sonicated for 5 minutes in a Sonicator 3000.

The span $\Delta D$ of the particles is calculated as follows: $\Delta D=(D_{90}-D_{10})/D_{50}$. $\Delta D$ is a measure of the particle size distribution of a population of particles and is a unitless number. A span $\Delta D$ above 1 indicates a particle population with a relatively higher proportion of larger particles and relatively fewer smaller particles. A span $\Delta D$ less than 1 indicates the opposite.

Specific surface area (SSA) is measured with Micromeritics TriStar II Surface Area Analyzer connected to a Micromeritics FlowPrep 060 Sample Degas System (capable of maintaining a temperature of 200° C.+/−20° C.) by nitrogen adsorption using BET method.

Alkyd melamine and PVDF/Acrylic paint masstone films are prepared from the mixture of 12.3 g of pigment and 39.3 g of alkyd melamine or 13.5 g of pigment and 86.5 g of PVDF/Acrylic paint, respectively. To aid in the dispersion of the pigment composition in the paint solvent, glass beads are used and mixing is performed in a mechanical shaker for 30 minutes. After shaking, the dispersion is separated from the glass media by gravity filtration through a paint strainer. Then the alkyd melamine and PVDF/acrylic paint are drawn down onto a Leneta card and chromated aluminum panels, respectively, with a RDS 70 drawdown bar. The alkyd melamine is cured in an oven at 350° F. for 30 minutes; the PVDF/acrylic is cured in an oven at 700° F. for 45 seconds. The color and total solar reflectance are measured after curing.

Plastic tint trials were prepared from the mixture of 70 g of PVC KDB-5001 (containing 9.09% TiO2) and 2 g of pigment using a Brabender 2-roll mill coupled to a Gaumer Co., Inc. oil heating unit.

The coloristic properties, i.e. CIELAB values, are measured with a Datacolor 600 spectrophotometer using the software CGREC v2.10, April 1997, Ciba Specialty Chemicals. Total solar reflectance over black in accordance with ASTM E903, is calculated based on standard reference spectral irradiance ASTM G173. Reflectance curves are recorded in the range 250-2500 nm, in 5 nm increments, using Perkin Elmer Lambda 950 UV/Vis/NIR Spectrophotometer. The standard CIELAB L*a*b* system is used to define the color of the pigment. The L* refers to the lightness of the sample, with L*=100 designating the lightness upper limit and L*=0 designating the darkness lower limit. The a* describes the red or green value of the pigment, with a positive a* value designating red, and a negative a* value designating green. The b* value represents the blue or yellow value, with a positive b* value designating yellow and a negative b* value designating blue.

Crystallite sizes are estimated with the software Diffrac. Suite. EVA v 2.0 using FWHM from the peak at 2 Theta=38.7°. The XRD spectra were recorded on a Bruker diffractometer using Cu Kα radiation source at 1.54056 Å and operated at 50 KV, 40 MA, using 0.03 degree 2 theta/step, and 0.5 sec/step for each scan. The software Diffrac. Suite is commercially available from Bruker Corporation of Billerica, Mass.

An embodiment of the invention is method of preparing an infrared reflective copper oxide pigment, comprising: (a) providing starting copper oxide particles that are at least 99% pure CuO and have the following characteristics: (i) $D_{10}$ particle size of 0.25-2 microns, (ii) $D_{50}$ particle size of 0.5-6 microns, (iii) $D_{90}$ particle size of 1-30 microns, (iv) span $\Delta D$ of 1-12, and (v) SSA of 5-50 m$^2$/g, (b) heating the copper oxide particles at a temperature of 900° F. to 1600° F., for a time of 1-1000 minutes, (c) milling the copper oxide particles sufficiently to achieve at least one characteristic selected from the group consisting of: (i) $D_{10}$ particle size of 0.3-2 microns, (ii) $D_{50}$ particle size of 0.6-3 microns, (iii) $D_{90}$ particle size of 0.9-5 microns, (iv) span $\Delta D$ 0.7-30 and (v) SSA of 2-10 m$^2$/g.

An embodiment of the invention is a method of preparing an infrared reflective copper oxide pigment, comprising: (a) providing starting copper oxide particles that are at least 99% pure CuO and have the following characteristics: (i) $D_{10}$ particle size of 0.4-1.2 microns, (ii) $D_{50}$ particle size of 0.9-5.1 microns, (iii) $D_{90}$ particle size of 2-22 microns, (iv) span $\Delta D$ of 1.6-8.8, and (v) SSA of 22-39 m$^2$/g, (b) heating the copper oxide particles at a temperature of 1100° F. to 1500° F., for a time of 20-120 minutes, (c) milling the copper oxide particles sufficiently to achieve at least one characteristic selected from the group consisting of: (i) $D_{10}$ particle size of 0.5-0.9 microns, (ii) $D_{50}$ particle size of 0.8-1.5 microns, (iii) $D_{90}$ particle size of 1.3-2.8 microns, (iv) span $\Delta D$ of 0.9-1.4 and (v) SSA of 1-10 m$^2$/g.

An embodiment of the invention is a paint or coating including the copper oxide pigment made by any method disclosed elsewhere herein. The paint or coating so pigmented exhibits at least one of the following: (a) CIELAB "L" masstone 25 to 31, preferably 26-30, more preferably 27-29; (b) "a" masstone of −1 to +3, preferably −0.5 to +2, more preferably 0 to +1; (c) "b" masstone of −3 to +2, preferably −2 to +1 and more preferably −1 to +0.5. Various embodiments may exhibit one, two or all three of the foregoing characteristics.

An embodiment of the invention is a method of preparing an infrared reflective copper oxide pigment, comprising: (a) providing starting copper oxide particles, (b) heating the copper oxide particles at a temperature of 900° F. to 1500° F., (c) milling the copper oxide particles sufficiently to achieve at least one characteristic selected from the group consisting of: (i) $D_{10}$ particle size of 0.5-1.25 microns, (ii) $D_{50}$ particle size of 0.75-1.5 microns, (iii) $D_{90}$ particle size of 1-10 microns, and (iv) SSA of 1-5 m$^2$/g.

Another embodiment of the invention is a method of preparing an infrared active copper oxide pigment, comprising: (a) providing at least 99 wt % pure copper oxide particles containing no intentional additions of any metal with which copper may form a mixed metal oxide, the particles having a specific surface area of 15-50 m²/g, (b) heating the copper oxide particles, for a time of 1 to 250 minutes, to at least one of (i) a furnace set temperature of 900° F. to 1500° F., and (ii) a copper oxide particle temperature of 1100-1300° F., (c) milling the copper oxide particles sufficiently to form finished copper oxide particles and to achieve at least one characteristic selected from the group consisting of: (i) $D_{10}$ particle size of 0.5-1.25 microns, (ii) $D_{50}$ particle size of 0.75-1.5 microns, (iii) $D_{90}$ particle size of 1-10 microns, and (iv) SSA of 1-5 m²/g, wherein the finished copper oxide particles exhibit a total solar reflectance over black of at least 17%, preferably at least 20%.

Still another embodiment of the invention is a method of preparing an infrared reflective copper oxide pigment comprising (a) providing at least 99 wt % pure copper oxide particles containing no intentional additions of any metal with which copper may form a mixed metal oxide, the particles having a specific surface area of 15-50 m²/g, (b) heating the copper oxide particles for at least one combination of time and temperature selected from the group consisting of (i) 1000-1100° F. for 30-150 minutes, (ii) 1100-1200° F. for 25-90 minutes, (iii) 1200-1300° F. for 20-75 minutes and (iv) 1300-1400° F. for 15-60 minutes, and (c) milling the copper oxide particles in a wet mill with zirconia beads for a time of 1-300 minutes.

teristics as set forth herein. In a preferred embodiment, two of the characteristics are as set forth herein below. In a more preferred embodiment, three characteristics are so set forth, in a yet more preferred embodiment, four characteristics are so set forth. In an even more preferred embodiment, all five characteristics are so set forth. In an even more preferred embodiment, all six characteristics are so set forth. In any embodiment, the starting copper oxide particle $D_{10}$ size is 0.25-2 microns, preferably 0.4-1.4, more preferably 0.4-1.2, still more preferably 0.4-0.9 microns and most preferably 0.5-0.8 microns. In any embodiment, the starting copper oxide particle $D_{50}$ size is 0.5-6 microns, preferably 0.7-5.5 microns, more preferably 0.9-5.1 microns, still more preferably 0.8-4 microns, even more preferably 0.9-3.5 microns, still more preferably 1-3.2 microns, and even more preferably 1-3 microns. In any embodiment, the starting copper oxide $D_{90}$ particle size is 1-30 microns, preferably 2-25 microns, more preferably 2-22 microns, still more 2-20 microns, yet more preferably 2-15 microns, and even more preferably 2.3-15 microns. In any embodiment, the starting copper oxide particle SSA is 5-50 m²/g, preferably 22-39 m²/g, more preferably 25-35 m²/g. In any embodiment, the starting copper oxide particle crystallite size is 1-19.5 nanometers, preferably 5-19 nanometers, more preferably 10-18 nanometers. In any embodiment, the starting copper oxide particle span $\Delta D$ is 1-12, preferably 1.3-10, more preferably 1.6-8.8. Various combinations of the broad, preferred and more preferred ranges of the six parameters set forth in this paragraph can be made to form distinct embodiments of the invention.

TABLE 1

Characteristics of Several Embodiments of the Invention.

| Material/process | Characteristic | X min | X max | Y min | Y max | Z min | Z max |
|---|---|---|---|---|---|---|---|
| Raw materials | D10 (microns) | 0.4 | 1.2 | 0.3 | 1.5 | 0.25 | 2 |
| | D50 (microns) | 0.9 | 5.1 | 0.7 | 5.5 | 0.5 | 6 |
| | D90 (microns) | 2 | 22.2 | 1.5 | 25 | 1 | 30 |
| | Crystallite size XRD (nm) | 10 | 18 | 5 | 19 | 1 | 19.5 |
| | Span | 1.6 | 8.8 | 1.3 | 10 | 1 | 12 |
| | SSA (m2/g) | 20 | 35 | 22 | 39 | 5 | 50 |
| Heat Treatment | Temperature (° F.) | 1100 | 1500 | 900 | 1600 | 900 | 1600 |
| | Time (min) | 20 | 120 | 1 | 1000 | 1 | 1000 |
| Lab milling | Time (min) | 25 | 65 | 10 | 130 | 10 | 130 |
| Production milling | Rate (lb/hour) | 200 | 300 | 200 | 400 | 200 | 500 |
| Invention pigment | D10 (microns) | 0.5 | 0.9 | 0.4 | 1.4 | 0.3 | 2 |
| | D50 (microns) | 0.8 | 1.5 | 0.7 | 2.2 | 0.6 | 3 |
| | D90 (microns) | 1.3 | 2.8 | 1 | 4 | 0.9 | 5 |
| | Crystallite size XRD (nm) | 25 | 38.5 | 22 | 40 | 19.6 | 42 |
| | Span | 0.9 | 1.4 | 0.8 | 2.5 | 0.7 | 3 |
| | SSA (m2/g) | 3 | 4.5 | 2 | 10 | 2 | 10 |

In any embodiment, in addition to other values disclosed elsewhere herein, starting copper oxide particles may be 98% pure, 97% pure, 96% pure, 95% pure, 94% pure, 93% pure, 92% pure, 91% pure, 90% pure or less or other values therebetween.

The starting particle sizes are important in achieving final particle size distributions of the inventive copper oxide pigments. In particular, the starting copper oxide particles have $D_{10}$, $D_{50}$ and $D_{90}$ characteristics as well as SSA, crystallite and span characteristics.

The starting copper oxide particles have at least one of the $D_{10}$, $D_{50}$, $D_{90}$, SSA, span $\Delta D$, and crystallite size charac- It is noted that from Table 1, above, embodiments of the invention can be constructed from values from the different columns labeled X, Y, and Z. Embodiments of the invention can also be constructed from values from the above table with not every characteristic specified.

The crystallite size of starting (raw) and heat treated copper oxide particles are shown in FIG. 1.

In an alternate embodiment, the starting copper oxide particles exhibit at least one characteristic selected from the group consisting of: (a) $D_{10}$ particle size of 0.5-0.8 microns, (b) $D_{50}$ particle size of 0.8-3.2 microns, and (c) $D_{90}$ particle size of 2.5-13 microns.

In an alternate embodiment, the starting copper oxide particles are used as received and broadly have at least one of the following characteristics: (a) $D_{10}$ particle size of 0.3-2 microns, (b) $D_{50}$ particle size of 0.5-4 microns, (c) $D_{90}$ particle size of 2-20 microns, (d) SSA of 20-35 m²/g. In a preferred embodiment, the starting copper oxide particles exhibit two of the foregoing characteristics. In a more preferred embodiment the starting copper oxide particles exhibit three of the foregoing characteristics. In a still more preferred embodiment the starting copper oxide particles exhibit four of the foregoing characteristics.

In an alternate embodiment, the starting copper oxide particles exhibit at least one characteristic selected from the group consisting of: (a) $D_{10}$ particle size of 0.4-0.9 microns, (b) $D_{50}$ particle size of 0.7-3.5 microns, and (c) $D_{90}$ particle size of 2-15 microns. In a preferred embodiment, the starting copper oxide particles exhibit two of the foregoing characteristics. In a more preferred embodiment the starting copper oxide particles exhibit three of the foregoing characteristics.

The starting particle surface area (SSA measured by the BET method) is important. In a preferred embodiment, the starting copper oxide particles have a SSA of 5-50 m²/g, preferably 6-40 m²/g, more preferably 15-50 m²/g, still more preferably 5-35 m²/g, yet more preferably 20-35 m²/g, and even more preferably 22-30 m²/g, alternately 22-39 m²/g.

That the goal of invention is to achieve a specific range of particle sizes $D_{10}$, $D_{50}$, $D_{90}$ and span $\Delta D$. After calcination, different particle reduction techniques can be used, for example milling procedures such as pancake jet mill, fluid bed jet mill, attritor mill, Sweco mill, and bead mill, where the common media are flint, alumina, and zirconia. In the examples below, two methods are used: pancake jet mill and wet mill with zirconia beads.

Spans ($\Delta D$) of the starting copper oxide particles may be 1-20, 1-12, 1.3-10, 1.5-9, 1.6-8.8, or 2-8. Spans of the finished (heated and milled) copper oxide particles may be 0.5-5, 0.6-4, 0.7-3, 0.9-2.5 or 0.9-1.4.

Two major trends become distinct in synthesis of powders with controlled particle size: bottom-up approach—where particles are grown to the desired size usually from a solution phase and top-down approach—where large particles are milled to a smaller size.

Using the bottom-up approach, the starting copper oxide particles are heated at a temperature of 800° F. to 1700° F., preferably 900° F. to 1600° F., more preferably 1000° F. to 1500° F. The heating may be undertaken for a time of 1 to 1000 minutes, preferably 1 to 250 minutes, more preferably 1-180 minutes, still more preferably 1-150 minutes, yet more preferably 20-120 minutes and even more preferably 30-90 minutes. The temperatures noted may either be considered the set temperature of a heating device or vessel (such as a furnace) used to heat the copper oxide particles or the temperatures actually attained by the copper oxide particles during heating.

Using the top down approach, after heating, the copper oxide particles are subjected to size reduction, for example, milling. The copper oxide particles are reduced in size such that at least one characteristic is achieved, selected from the group consisting of (a) $D_{10}$ particle size of 0.3-2 microns, (b) $D_{50}$ particle size of 0.6-3 microns, (c) $D_{90}$ particle size of 0.9-5 microns, (d) SSA of 1-10 m²/g and (e) span $\Delta D$ of 0.7-3. In a preferred embodiment, starting copper oxide particles are milled sufficiently to achieve two of the foregoing characteristics. In a more preferred embodiment the starting copper oxide are milled sufficiently to achieve three of the foregoing characteristics. In a still more preferred embodiment the starting copper oxide are milled sufficiently to achieve four of the foregoing characteristics. Most preferably all five characteristics are achieved.

In a preferred embodiment, the starting copper oxide particles are milled sufficiently to achieve at least one characteristic selected from the group consisting of: (a) $D_{10}$ particle size of 0.5-0.9 microns, (b) $D_{50}$ particle size of 0.8-1.7 microns, and (c) $D_{90}$ particle size of 1.3-2.7 microns. In a preferred embodiment, starting copper oxide particles are milled sufficiently to achieve two of the foregoing characteristics. In a more preferred embodiment the starting copper oxide are milled sufficiently to achieve three of the foregoing characteristics. In a still more preferred embodiment the starting copper oxide are milled sufficiently to achieve four of the foregoing characteristics. Most preferably all five characteristics are achieved.

In a preferred embodiment, the starting copper oxide particles are milled sufficiently to achieve at least one characteristic selected from the group consisting of: (a) $D_{10}$ particle size of 0.55-0.85 microns, (b) $D_{50}$ particle size of 0.9-1.6 microns, and (c) $D_{90}$ particle size of 1.4-2.6 microns. In a preferred embodiment, starting copper oxide particles are milled sufficiently to achieve two of the foregoing characteristics. In a more preferred embodiment the starting copper oxide are milled sufficiently to achieve three of the foregoing characteristics.

In various embodiments, the starting copper oxide particles are milled sufficiently to achieve SSA in m²/g of 1-10, 2-10, 2-8 m²/g, 2-5 m²/g, or 3-4.5.

The finished copper oxide particles have $D_{10}$, $D_{50}$ and $D_{90}$ particle size characteristics as set forth hereinbelow. In one embodiment, the finished copper oxide particles have at least one of the $D_{10}$, $D_{50}$ and $D_{90}$ characteristics as set forth hereinbelow. In a preferred embodiment, two of the characteristics are as set forth hereinbelow. In a more preferred embodiment, all three characteristics are so set forth. The finished copper oxide particles have a $D_{10}$ particle size of 0.4-1.4 microns, preferably 0.5-1.2 micron, more preferably 0.5-0.9 microns, still more preferably 0.55-0.85 microns, yet more preferably 0.5-0.8 microns. The finished $D_{50}$ particle size is 0.9-2.2 microns, preferably 0.8-1.7 microns, more preferably 1.1-1.7 microns, and most preferably 1.2-1.6 microns. The finished $D_{90}$ particle size is 1-4 microns, preferably 1.1-3.5 microns, more preferably 1.3-2.7 microns, most preferably 1.4-2.6 microns.

In a preferred embodiment, the starting copper oxide particles do not contain any intentional additions of any element selected from the group consisting of alkali metals, alkaline-earth metals, early transition metals, late transition metals, post-transition metals, poor metals, rare earths and metalloids. In a preferred embodiment, starting copper oxide particles do not contain any intentional additions of any metal selected from the group consisting of Bi, Sb, Ti, V, Cr, Mn, Fe, Co, Ni, Zn, Y, Zr, Nb, Tc, Ru, Rh, Pd, Ag, and Cd.

Starting copper oxide particles may include impurities (not intentionally added) up to a total of 1 wt % of metals (or oxides thereof) selected from the group consisting of Bi, Sb, Ti, V, Cr, Mn, Fe, Co, Ni, Zn, Y, Zr, Nb, Tc, Ru, Rh, Pf, Ag, and Cd. However the presence of other metals or oxides is not preferred, and a lack of intentional additions is preferred. Percentages are expressed such that a total composition includes 100%.

In any method or any composition disclosed herein, the starting copper oxide particles may further comprise up to a total of 1% of at least one selected from the group consisting of Mg, Al, Si, In, Sn, Ce, Ta, and F or such elements may be intentionally added to the starting copper oxide particles.

In any method disclosed herein, the method may further comprise a step of combining with the starting copper oxide particles, 0.001 to 0.4 wt % of a source of at least one selected from the group consisting of Mg, Al, Si, In, Sn, Ce, Ta, and F In any method disclosed herein, the method may further comprise a step of combining with the starting copper oxide particles, 0.01-1 wt % of a source of at least one oxide selected from the group consisting of $TiO_2$, ZnO, $Bi_2O_3$, and $Nb_2O_5$.

An embodiment of the invention is a copper oxide pigment having the following characteristics: (a) $D_{10}$ particle size of 0.3-2 microns, (b) $D_{50}$ particle size of 0.6-3 microns, (c) $D_{90}$ particle size of 0.9-5 microns, (d) SSA of 2-10 $m^2/g$, and (e) span $\Delta D$ of 0.7-3.0.

In a preferred embodiment, the copper oxide pigment of the invention has the following characteristics: (a) the $D_{10}$ particle size is 0.4-1.4 microns, (b) the $D_{50}$ particle size is 0.7-2.2 microns, (c) the $D_{90}$ particle size is 1.0-4.0 microns, and (d) the SSA is 2-8 $m^2/g$, and (e) the span $\Delta D$ is 0.8-2.5.

In a more preferred embodiment, the copper oxide pigment of the invention has the following characteristics (a) the $D_{10}$ particle size is 0.5-0.9 microns, (b) the $D_{50}$ particle size is 0.8-1.5 microns, (c) the $D_{90}$ particle size is 1.3-2.8 microns, (d) the SSA is 3.0-4.5 $m^2/g$, and (e) the span $\Delta D$ is 0.9-1.4.

While the initial research showed that a high-IR-reflecting pigment could be made by thermal processing and milling of a relatively pure CuO raw material source, the inventors later found that a variety of dopants could be added for various purposes that would not significantly change the pigment color values or reduce the % TSR or the pigment strength. These additives may function, for example, as alkali scavengers, halide scavengers, or in some other way control particle growth during calcination. Likewise, a number of essentially inert ingredients could be added that would not detract from these properties. Since the advantages of these dopants is often difficult to establish as they are secondary factors, a simple list of additives which will not detract from the pigmentary properties of the CuO is presented. The dopants may include one or more of the following metal oxide or metal oxide precursors (metal carbonates, ethoxides, hydroxides, nitrates, etc.) in the range of 0.01-5.00 mole %: Ti, V, Cr, Mn, Fe, Co, Ni, Zn, Y, Zr, Nb, Tc, Ru, Rh, Pd, Ag, Cd, Sb, Bi. However, the preferred embodiment includes pure CuO with no intentional additions of any metal or oxide.

An embodiment of the invention is a paint or coating comprising particles made by any method disclosed herein, wherein the paint or coating exhibits a total solar reflectance over black of at least 17% and preferably at least 20%.

The tint strength of the pigments of the invention are similar or greater than those of the prior art. In particular, the tint strength of the pigments of the invention are 50-150%, preferably 60-150, more preferably 70-140, still more preferably 80-140, even more preferably 100-140%. Pigment strengths may be measured relative to Ferro pigment V-774.

Applications. The pigments of the invention may be used to impart color to paints (and other coatings), curable coatings (such as radiation curable), inks, plastics, rubbers, ceramics, enamels, and glasses. Plastic or rubber substrate compositions that can be colored and marked using the copper oxide pigments according to this invention can be based upon polymeric materials that can be natural or synthetic. Halogenated polymers can be used. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produced by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methacrylic acid esters, butadiene, as well as co polymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures as plastic material or melts spun into fibers. They can also be dissolved as film formers or binders for laquers, paints, or printing inks such as linseed oil, nitrocellulose, melamine resins, acrylic resins, urea formaldehyde resins and the like. The pigmentary use of the present copper oxide compounds in other coatings or materials such as carbon-carbon composites may also provide advantages with regard to IR reflection. Also a plastic body as a substrate which would contain the pigment (such as vinyl siding) and/or any substrate (glass, ceramic, metal, plastic, composite) having thereon an organic coating or paint which would contain and utilize the high contrast laser markability, electronic properties, or low heat build-up properties of the copper oxide containing pigments of the invention.

Curable coatings. Representative useful thermoplastic polymers include polyolefins such as polyethylene and polypropylene, polyesters, polycarbonates, polysulfones, polyimides, polyamides, polyurethanes, acrylics, styrene acrylics, polyvinyl chlorides, and others. For certain high solid applications, thermoplastic polymers having a number average molecular weight less than 35,000, and optionally less than about 20,000, and optionally less than 10,000, will provide relatively low viscosity solutions when dissolved in suitable amounts of the unsaturated monomers, oligomers and reactants. Thermoplastic acrylic polymers are generally useful to provide favorable cost and performance characteristics, and are conveniently prepared by methods well known in the art such as by solution polymerization of acrylic and/or methacrylic monomers in an appropriate solvent or diluent.

An embodiment of the invention is a plastic, rubber or curable coating as set forth in the preceding two paragraphs including a copper oxide particle disclosed elsewhere herein or made by any method disclosed elsewhere herein.

EXAMPLES

The following examples illustrate, but do not limit, the scope of the invention.

Comparative examples presented in the tables demonstrate that that certain range of particle size, temperature, holding time and milling conditions can produce a copper oxide pigment providing infrared reflectivity, but conditions outside these ranges do not produce good pigments. For example, it is seen that lower heat treatment temperatures such as 450° F. or 750° F. do not produce adequate TSR over black (17 or more) and higher heat treatment temperatures such as 1625° F. also do not produce adequate TSR over black.

In the examples that follow, the identifiers Samples A-F have the following meanings.

A. Raw materials are CuO commercially available from Ferro Corporation, Washington, Pa., and pigments processed as described in the examples 1, 3 and 4 are compared in paint and plastic. CuO obtained from Grillo Werke AG, Duisberg, Germany and/or Phibro-Tech, Inc., Teaneck N.J., served as the comparative examples.

B. and C. Pigments originating from two different CuO raw materials (CuO Raw C and CuO Raw D) are processed as described in the examples 2a and 2b, but heat treated at various temperatures. Their characteristics in paint and plastic are compared.

D. Pigments prepared similar as described in example 2a, but heat treated with various holding times, are compared in paint and plastic.

E. Pigment prepared as in the example 1 is compared to other Ferro Corporation Cool Colors® IR pigments (10201, 10202, 10203, V-774, V-775 and V-785) in paint and plastic.

F. Pigment prepared as in the example 1 and other Ferro pigments are compared in PVDF/Acrylic to a value of L=50.

Example 1

150 g of copper oxide (CuO Raw C, Table 2) is placed in an alumina sagger and heat treated into an electric kiln at 649° C. (1200° F.) for one hour. The sample is then quenched in air and bead milled (zirconia balls) in water for one hour, to break up the agglomerates. The slurry is dried to provide a black pigment, O-1358 #60, with the physical properties presented in Table 2, below. Abbreviations in the tables are as follows: electric-small is a lab scale electric furnace (oven) with a capacity under 1 pound. Electric-big is a lab scale electric furnace (oven) with capacity of two pounds. Rotary is a production scale rotary kiln with a capacity of at least 6000 pounds. Gas kiln is a lab scale gas furnace (oven) with a capacity of two pounds. JM is a production scale cyclonic jet mill. The reported strength values, in plastic, are calculated relative to the V-774 standard values for which are given in Table 7, below. V-774 is a chromium green-black hematite pigment commercially available from Ferro Corporation, Cleveland, Ohio, under the GEODE® name.

TABLE 2

Comparison in paint and plastic of raw materials CuO available in our plant, and pigments processed as described in the examples 1, 3 and 4.

| | | Samples A | | | | | |
| --- | --- | --- | --- | --- | --- | --- | --- |
| | | CuO Raw A | CuO Raw B | CuO Raw C | O-1358 #60 | O-1358 631383 | O-1358 #110 |
| Synthesis | Heat treat temp (° F.) | NA | NA | NA | 1200 | 1350 | 1350 |
| | Holding time (min) | NA | NA | NA | 60 | 60 | 60 |
| | Milling time (min) | NA | NA | NA | 60 | JM | 60 |
| | Oven type | NA | NA | NA | electric - big | rotary | gas kiln |
| | Batch mass | NA | NA | NA | 150 g | 3000 Kg | 150 g |
| | Comments | | raw material, no heat treatment | | | | |
| Powder physical properties | D10 (μm) | 9.48 | 1.175 | 0.446 | 0.713 | 0.61 | |
| | D50 (μm) | 17.09 | 5.285 | 1.148 | 1.155 | 1.007 | |
| | D90 (μm) | 32.865 | 9.855 | 5.007 | 1.924 | 1.827 | |
| | Surface area (m2/g) | 2.72 | 8.62 | 23.56 | 4.01 | 3.65 | |
| | Span | 1.37 | 1.64 | 3.97 | 1.05 | 1.21 | |
| Alkyd melamine paint | % TSR OW | 28.3 | 27.5 | 28.6 | 20.6 | 20.4 | 22.4 |
| | % TSR OB | 21.1 | 20.7 | 14.2 | 19.6 | 19.6 | 21.5 |
| | "L" Mass tone | 28.55 | 28.33 | 27.4 | 28.03 | 27.77 | 27.8 |
| | "a" Mass tone | 0.64 | 0.75 | 0.91 | 0.7 | 0.67 | 0.5 |
| | "b" Mass tone | 0.27 | 0.48 | 0.79 | −0.32 | −0.24 | −0.45 |
| Plastic | "L" Tint tone | 79.12 | 67.66 | 58.5 | 50.95 | 51.98 | 51.56 |
| | "a" Tint tone | 0.74 | −0.45 | 1.4 | −0.42 | −0.37 | −0.49 |
| | "b" Tint tone | 10.88 | 7.17 | 7.11 | −1.95 | −1.01 | −2.45 |
| | Strength | 16.65 | 39.72 | 86.39 | 117.6 | 104.7 | 113.2 |

Example 2a

In Table 3, below, 80 g of copper oxide (CuO Raw C) is placed in an alumina sagger and heat treated into an electric kiln pre-heated between 732° C. (1350° F.) for 40 min. The sample is then quenched in air and milled with zirconia beads in water for 30 min, to break up the agglomerates. The slurry is dried to provide a black pigment, O-1358 #25 with the physical properties presented in Table 3. Other batches (Samples B) are processed similarly as indicated in Table 3.

TABLE 3

Comparison in paint and plastic of CuO Raw C, heat treated at various temperatures, as described in example 2a.

|  |  | CuO Raw C | 19 | 21 | 23 | 25 | 27 | 29 |
|---|---|---|---|---|---|---|---|---|
| Synthesis | Heat treatment temp (F) | NA | 450 | 750 | 1050 | 1350 | 1500 | 1625 |
|  | Holding time (min) | NA | 40 | 40 | 40 | 40 | 40 | 40 |
|  | Milling time (min) | NA | 30 | 30 | 30 | 30 | 30 | 30 |
|  | Oven type | NA | electric - small | electric - small | electric - small | electric - small | electric - small | electric - small |
|  | Batch mass | NA | 80 g | 80 g | 80 g | 80 g | 80 g | 80 g |
|  | Comments | raw material, no heat treatment | | | | | | |
| Powder physical properties | D10 (μm) | 0.446 | 0.464 | 0.496 | 0.515 | 0.754 | 1.254 | 1.604 |
|  | D50 (μm) | 1.148 | 0.937 | 0.915 | 0.821 | 1.169 | 1.953 | 2.519 |
|  | D90 (μm) | 5.007 | 1.973 | 1.736 | 1.352 | 1.81 | 3.024 | 3.882 |
|  | Surface area (m2/g) | 23.56 | 23.6 | 15.78 | 6.12 | 2.87 | 1.42 | 1.22 |
|  | Span | 3.97 | 1.61 | 1.36 | 1.02 | 0.90 | 0.91 | 0.90 |
| Alkyd melamine paint | % TSR OW | 28.6 | 26 | 14.2 | 18.6 | 21 | 16.4 | 14.1 |
|  | % TSR OB | 14.2 | 16.6 | 12.4 | 17.7 | 20.7 | 16.2 | 14.1 |
|  | "L" Mass tone | 27.4 | 27.75 | 28.03 | 28.28 | 27.41 | 27.44 | 27.56 |
|  | "a" Mass tone | 0.91 | 1.06 | 0.82 | 1.19 | 0.32 | 0 | −0.03 |
|  | "b" Mass tone | 0.79 | 0.85 | 0.07 | 0.3 | −0.83 | −1.18 | −1.04 |
| Plastic | "L" Tint tone | 58.5 | 51.87 | 49.29 | 48.61 | 53.82 | 63.55 | 66.84 |
|  | "a" Tint tone | 1.4 | 2.12 | 1.96 | 0.7 | −1.02 | −1.57 | −1.51 |
|  | "b" Tint tone | 7.11 | 5.49 | 3.8 | −0.76 | −2.69 | −1.73 | 0.66 |
|  | Strength | 86.36 | 139.25 | 158.62 | 138.72 | 95.46 | 40.49 | 28.58 |

Example 2b 80 g of copper oxide (CuO Raw D in Table 4) is placed in an alumina sagger and heat treated into an electric kiln pre-heated between 732° C. (1350° F.) or 815° C. (1500° F.) for 40 min. The sample is then quenched in air and milled with zirconia beads in water for 30 min, to break up the agglomerates. The slurry is dried to provide a black pigment, samples 24 and 26 in Table 4, with physical properties presented in Table 3.

TABLE 4

Comparison in paint and plastic of CuO Raw D, heat treated at various temperatures, as described in example 2b.

|  |  | CuO Raw D | 18 | 20 | 22 | 24 | 26 | 28 |
|---|---|---|---|---|---|---|---|---|
| Synthesis | Heat treatment temp (° F.) | NA | 450 | 750 | 1050 | 1350 | 1500 | 1625 |
|  | Holding time (min) | NA | 40 | 40 | 40 | 40 | 40 | 40 |
|  | Milling time (min) | NA | 30 | 30 | 30 | 30 | 30 | 30 |
|  | Oven type | NA | electric - small | electric - small | electric - small | electric - small | electric - small | electric - small |
|  | Batch mass | NA | 80 g | 80 g | 80 g | 80 g | 80 g | 80 g |
|  | Comments | raw material, no heat treatment | | | | | | |
| Powder physical properties | D10 (μm) | 0.997 | 0.706 | 0.77 | 0.886 | 0.8 | 0.926 | 1.745 |
|  | D50 (μm) | 4.22 | 1.853 | 2.022 | 2.149 | 1.496 | 1.536 | 2.788 |
|  | D90 (μm) | 9.982 | 4.34 | 5.187 | 5.697 | 2.812 | 2.577 | 4.365 |

TABLE 4-continued

Comparison in paint and plastic of CuO Raw D, heat treated at various temperatures, as described in example 2b.

| | | Samples C | | | | | | |
|---|---|---|---|---|---|---|---|---|
| | | CuO Raw D | 18 | 20 | 22 | 24 | 26 | 28 |
| | Surface area (m2/g) | 5.87 | 7.19 | 5.57 | 3.35 | 2.99 | 2.16 | 1.13 |
| | Span | 2.13 | 1.96 | 2.18 | 2.24 | 1.34 | 1.07 | 0.94 |
| Alkyd | % TSR OW | 11.4 | 12.4 | 11.6 | 12.1 | 18.4 | 18.9 | 15 |
| melamine | % TSR OB | 11.3 | 12.2 | 11.5 | 12 | 17.9 | 18.2 | 13.7 |
| paint | "L" Mass tone | 28.21 | 28.14 | 28.08 | 27.92 | 27.5 | 27.34 | 27.08 |
| | "a" Mass tone | 0.91 | 0.74 | 0.69 | 0.62 | 0.35 | 0.13 | −0.03 |
| | "b" Mass tone | 0.79 | 0.37 | 0.26 | −0.1 | −0.79 | −0.99 | −1.06 |
| Plastic | "L" Tint tone | 65 | 59.74 | 60.36 | 61.79 | 57.41 | 58.96 | 68.03 |
| | "a" Tint tone | −0.73 | −0.13 | −0.32 | −0.67 | −1.07 | −1.26 | −1.47 |
| | "b" Tint tone | 5.07 | 3.6 | 3.17 | 2.58 | 0.01 | −1.79 | 1.45 |
| | Strength | 44.03 | 63.73 | 59.01 | 50.22 | 65.28 | 60.19 | 26.54 |

Example 3

2806 Kg (6186 pounds) of copper oxide with median particle size of 1.2-3.5 microns and surface area 23-33 m$^2$/g is fed into a rotary kiln at 732° C. (1350° F.) with a residence time of one hour followed by milling into a cyclonic jet mill, to break up the agglomerates and provide a black pigment, O-1358 #631383, with the physical properties presented in Table 2.

Example 4

150 g of copper oxide with median particle size of 1.2-3.5 microns and surface area 23-33 m$^2$/g is placed in a alumina sagger and heat treated into a gas kiln with the following temperature profile: rapid ramp to 400° C. (752° F.), ramp in 3 hours to 732° C. (1350° F.), and held at this temperature for one hour. This is followed by cooling in 6 hours to 30° C. (86° F.). The cooled sample is then milled with zirconia beads in water for one hour to break up the agglomerates. The slurry is dried to provide a black pigment, O-1358 #110, with the physical properties presented in Table 2.

Example 5

In Sample group D, 80 grams of starting CuO Raw C are heated at 1050° F. or 1350° F. at times of 20-120 minutes and milled for 30 minutes. The processing conditions, particle sizes and pigment properties are presented in Table 5.

TABLE 5

Comparison in paint and plastic of pigments prepared similarly as described in example 2a, but heat treated with various holding times.

| | | Samples D | | | | | | | | | | |
|---|---|---|---|---|---|---|---|---|---|---|---|---|
| | | CuO Raw C | 30 | 31 | 32 | 33 | 34 | 35 | 36 | 37 | 38 | 39 |
| Synthesis | HT temp (° F.) | NA | 1050 | 1050 | 1050 | 1050 | 1050 | 1350 | 1350 | 1350 | 1350 | 1350 |
| | Holding time (min) | NA | 20 | 40 | 60 | 80 | 120 | 20 | 40 | 60 | 80 | 120 |
| | Milling time (min) | NA | 30 | 30 | 30 | 30 | 30 | 30 | 30 | 30 | 30 | 30 |
| | Oven type | NA | | | | | ELECTRIC SMALL | | | | | |
| | Batch mass | NA | 80 g | 80 g | 80 g | 80 g | 80 g | 80 g | 80 g | 80 g | 80 g | 80 g |
| | Comments | raw mat'l, no heat treatment | | | | | | | | | | |
| Alkyd | % TSR OW | 28.6 | 16.0 | 18.5 | 18.5 | 19.4 | 19.3 | 20.7 | 19.8 | 19.5 | 18.6 | 18.7 |
| melamine | % TSR OB | 14.2 | 14.7 | 17.6 | 17.8 | 18.7 | 18.6 | 20.4 | 19.5 | 19.3 | 18.3 | 18.6 |
| paint | "L" Mass tone | 27.4 | 28.69 | 28.16 | 28.04 | 27.93 | 27.97 | 27.59 | 27.12 | 27.13 | 27.23 | 27.25 |
| | "a" Mass tone | 0.91 | 1.13 | 1.11 | 0.99 | 0.89 | 0.92 | 0.73 | 0.13 | 0.2 | 0.07 | 0.11 |
| | "b" Mass tone | 0.79 | 0.9 | 0.35 | 0.24 | 0.05 | 0 | −0.19 | −0.92 | −0.9 | −1.06 | −1 |
| Plastic | "L" Tint tone | 58.5 | 48.5 | 48.6 | 49.04 | 49.62 | 49.53 | 51.1 | 55.45 | 55.39 | 58.02 | 57.13 |
| | "a" Tint tone | 1.4 | 1.55 | 0.66 | 0.37 | 0.01 | 0.03 | −0.43 | −1.27 | −1.14 | −1.52 | −1.69 |
| | "b" Tint tone | 7.11 | 1.38 | −1.04 | −1.21 | −1.42 | −1.35 | −2.03 | −2.52 | −3 | −2.06 | −1.45 |
| | Strength | 86.36 | 148.16 | 138.91 | 133.00 | 128.28 | 129.03 | 116.29 | 83.11 | 84.24 | 66.32 | 70.85 |

The infrared spectrum shown in FIG. 2 demonstrates the results of processing copper oxides by the inventive method. The two top curves are from O-1358 copper oxides processed according to the invention.

TABLE 6

Summary of Results of total solar reflectance changes due to processing of CuO according to the invention.

|  | TSR over black (%) | UV reflection (%) | Visible Reflection (%) | IR reflection (%) |
|---|---|---|---|---|
| CuO Raw C Over black (Raw) | 14.0 | 0.1 | 2.2 | 11.7 |

TABLE 6-continued

Summary of Results of total solar reflectance changes due to processing of CuO according to the invention.

|  | TSR over black (%) | UV reflection (%) | Visible Reflection (%) | IR reflection (%) |
|---|---|---|---|---|
| O-1358 631838 | 19.6 | 0.2 | 2.2 | 17.2 |
| O-1358 #60 | 19.6 | 0.2 | 2.2 | 17.2 |

In the spectra of FIG. 2 and Table 6, CuO Raw C is the starting material that is processed to make O-1358. Note that processing by the method of the invention the TSR (over black) increased from 14.0 to 19.6.

TABLE 7

Samples E. Comparison in paint and plastic of pigment prepared as in the example 1 and other Cool IR Ferro pigments (10201, 10202, 10203, V-774, V-775 and V-785).

| | | Samples E | | | | |
|---|---|---|---|---|---|---|
| | | O-1358 #60 | 10201 STD | 10202 STD | 10203 STD | V-774 STD |
| Synthesis | Heat treatment temp (° F.) | 1200 | | | | |
| | Holding time (min) | 60 | | | | |
| | Milling time (min) | 60 | | | | |
| | Oven type | electric - big | | | | |
| | Batch mass | 150 g | | | | |
| Powder physical properties | D10 (μm) | 0.713 | 0.736 | 1.326 | 0.518 | 0.741 |
| | D50 (μm) | 1.155 | 1.346 | 2.077 | 0.867 | 1.129 |
| | D90 (μm) | 1.924 | 2.42 | 3.219 | 1.451 | 1.727 |
| | Surface area (m2/g) | 4.01 | 2.53 | 1.76 | 7.1 | 2.61 |
| Alkyd melamine paint | % TSR OW | 20.6 | 22.9 | 33.7 | 24.7 | 22.9 |
| | % TSR OB | 19.6 | 22.0 | 30.7 | 19.8 | 21.5 |
| | "L" Mass tone | 28.03 | 27.67 | 29.34 | 28.15 | 27.47 |
| | "a" Mass tone | 0.7 | 0.48 | 2.65 | −1.49 | 1.17 |
| | "b" Mass tone | −0.32 | −0.13 | 1.41 | −3.59 | −0.66 |
| Plastic | "L" Tint tone | 50.95 | 57.33 | 63.58 | 58.97 | 53.49 |
| | "a" Tint tone | −0.42 | −0.39 | 0.02 | −5.57 | 0.34 |
| | "b" Tint tone | −1.95 | −3.62 | −3.45 | −7.51 | −5.26 |
| | Strength | 117.6 | 70.46 | 39.95 | 80.53 | 100 |

Pigment prepared as in the example 1 and other Ferro pigments are compared in PVDF/Acrylic to a value of L=50. PVDF/Acrylic films were drawn on chromated aluminum panels, with a drawdown bar #70, from a mixture of 13.5 g of pigment and 86.5 g of PVDF/Acrylic paint. The mixture was previously bead milled with 60 g of glass beads and filtered. The films were cured at 700° F. for 45 seconds and quenched in room temperature water.

TABLE 8

Samples F. Comparison in PVDF/Acrylic to a value of L = 50 of pigment prepared as in the example 1 and other Ferro pigments. Those with "STD" in the name are unprocessed standard powders.

| | | Samples F | | | | | | |
|---|---|---|---|---|---|---|---|---|
| | | O-1358 #60 | V-7709 STD | 10201 STD | 10202 STD | V-774 STD | V-775 STD | V-785 STD |
| Synthesis | Heat treatment temp (° F.) | 1200 | | | | | | |
| | Holding time (min) | 60 | | | | | | |
| | Milling time (min) | 60 | | | | | | |
| | Oven type | electric - big | | | | | | |
| | Batch mass (g) | 150 | | | | | | |
| Powder physical properties | D10 (μm) | 0.713 | 0.692 | 0.736 | 1.326 | 0.741 | n.m. | 1.046 |
| | D50 (μm) | 1.155 | 1.053 | 1.346 | 2.077 | 1.129 | n.m. | 1.567 |
| | D90 (μm) | 1.924 | 1.636 | 2.42 | 3.219 | 1.727 | n.m. | 2.343 |
| | Surface area (m2/g) | 4.01 | 3.47 | 2.53 | 1.76 | 2.61 | 1.77 | 1.59 |
| PVDF/ Acrylic | % TSR | 39.1 | 17.6 | 34.5 | 43.2 | 36.2 | 33.3 | 35.1 |
| | "L" | 49.4 | 49.14 | 49.92 | 49.37 | 50.4 | 49.54 | 49.77 |
| | "a" | −0.55 | −1.71 | −0.93 | 0.36 | −0.27 | −0.89 | −0.77 |
| | "b" | −4.24 | −4.93 | −4.22 | −2.97 | −5.03 | −4.93 | −4.82 |

Example 6

As set forth below in Table 9, The raw material Copper (II)carbonate:Copper(II) hydroxide in a 1:1 molar ratio, is heat treated at 1200° F. (649° C.) to obtain a pigment that is an embodiment of the invention. According to thermal analysis, copper (II) carbonate:copper (II) hydroxide (1:1) completely decomposes to copper oxide at 350° C.

TABLE 9

Example 6 Powder Physical Properties before and after heat treating.

| | | Copper(II) carbonate:Copper (II) hydroxide Raw Material | Heat treated Invention Pigment copper (II) oxide |
|---|---|---|---|
| Powder physical properties | D10 (μm) | 20.5 | 0.6 |
| | D50 (μm) | 33.1 | 0.9 |
| | D90 (μm) | 60.5 | 1.4 |
| | Crystallite Size (nm) | — | 28.7 |
| | Span | 1.2 | 0.9 |
| | SSA (m2/g) | 15.23 | 3.9 |

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

The invention claimed is:

1. A method of preparing an infrared reflective copper oxide pigment, comprising:
   a. providing starting copper oxide particles that are at least 99% pure CuO and have the following characteristics:
      i. $D_{10}$ particle size of 0.25-2 microns,
      ii. $D_{50}$ particle size of 0.5-6 microns,
      iii. $D_{90}$ particle size of 1-30 microns,
      iv. span $\Delta D$ of 1-12,
      v. specific surface area of 5-50 m$^2$/g,
      vi. a crystallite size of 1-19.5 nanometers,
      vii. when present in an alkyd melamine paint, exhibit a total solar reflectance over black of less than 17,
   b. heating the copper oxide particles at a temperature of 900° F. to 1600° F., for a time of 1-1000 minutes,
   c. milling the copper oxide particles sufficiently to produce finished copper oxide particles having the following characteristics:
      i. $D_{10}$ particle size of 0.3-2 microns,
      ii. $D_{50}$ particle size of 0.6-3 microns,
      iii. $D_{90}$ particle size of 0.9-5 microns,
      iv. span $\Delta D$ of 0.7-3.0,
      v. specific surface area of 2-10 m$^2$/g,
      vi. a crystallite size of 19.6-42 nanometers,
      vii. when present in an alkyd melamine paint, exhibit a total solar reflectance over black of 17 or greater, and
      viii. has a tint-strength of 60% to 150% relative to V-774 pigment when used in polyvinyl chloride.

2. The method of claim 1, wherein the starting copper oxide particles have a specific surface area of 22-39 m$^2$/g.

3. The method of claim 1, wherein the starting copper oxide particles exhibit at least one characteristic selected from the group consisting of:
   a. $D_{10}$ particle size of 0.3-1.5 microns,
   b. $D_{50}$ particle size of 0.7-5.5 microns,
   c. $D_{90}$ particle size of 1.5-25 microns,
   d. specific surface area of 22-39 m$^2$/g,
   e. span $\Delta D$ of 1.3-10, and
   f. crystallite size of 5 to 19 nanometers.

4. The method of claim 1, wherein the starting copper oxide particles exhibit at least one characteristic selected from the group consisting of:
   a. $D_{10}$ particle size of 0.4-1.2 microns,
   b. $D_{50}$ particle size of 0.9-5.1 microns,
   c. $D_{90}$ particle size of 2-22.2 microns,
   d. span $\Delta D$ of 1.6-8.8, and
   e. crystallite size of 10-18 nanometers.

5. The method of claim 1, wherein the starting copper oxide particles are milled sufficiently to achieve at least one characteristic selected from the group consisting of:
   a. $D_{10}$ particle size of 0.4-1.4 microns,
   b. $D_{50}$ particle size of 0.7-2.2 microns,
   c. $D_{90}$ particle size of 1-4 microns,
   d. specific surface area of 2-10 $m^2/g$,
   e. span $\Delta D$ of 0.8-2.5, and
   f. crystallite size of 22-40 nanometers.

6. The method of claim 1, wherein the starting copper oxide particles are milled sufficiently to achieve at least one characteristic selected from the group consisting of:
   a. $D_{10}$ particle size of 0.5-0.9 microns,
   b. $D_{50}$ particle size of 0.8-1.5 microns, and
   c. $D_{90}$ particle size of 1.3-2.8 microns,
   d. specific surface area of 3-4.5 $m^2/g$,
   e. span $\Delta D$ of 0.9-1.4, and
   f. crystallite size of 25-38.5 nanometers.

7. The method of claim 6, wherein at least two said characteristics are achieved.

8. The method of claim 6, wherein at least three said characteristics are achieved.

9. The method of claim 6, wherein at least four said characteristics are achieved.

10. The method of claim 1, wherein the starting copper oxide particles do not contain any intentional additions of any element selected from the group consisting of alkali metals, alkaline-earth metals, early transition metals, late transition metals, post-transition metals, poor metals, rare earths and metalloids.

11. The method of claim 1, wherein there are no intentional additions of metal or metal oxides that would be sufficient to cause a transformation of copper(II) oxide away from a monoclinic crystal system.

12. The method of claim 1, wherein the starting copper oxide particles do not contain any intentional additions of any metal selected from the group consisting of Bi, Sb, Ti, V, Cr, Mn, Fe, Co, Ni, Zn, Y, Zr, Nb, Tc, Ru, Rh, Pd, Ag, and Cd.

13. The method of claim 1, wherein the starting copper oxide particles further comprise up to a total of 1% of at least one element selected from the group consisting of Mg, Al, Si, In, Sn, Ce, Ta, and F or wherein said elements are intentionally added to the starting copper oxide particles.

14. The method of claim 1, further comprising step (a1): combining with the starting copper oxide particles 0.001 to 0.4 wt % of a source of at least one selected from the group consisting of Mg, Al, Si, In, Sn, Ce, Ta, and F.

15. The method of claim 1, further comprising step (a1): combining with the starting copper oxide particles 0.01-1 wt % of a source of at least one oxide selected from the group consisting of $TiO_2$, $ZnO$, $Bi_2O_3$, and $Nb_2O_5$.

16. The method of claim 1, wherein the starting copper oxide particles are provided by heat treatment of at least one copper compound wherein copper is in the +1 or +2 oxidation state and decomposes or oxidizes upon heating to copper (II) oxide.

17. A composition comprising particles made by the method of claim 1, wherein the composition exhibits a total solar reflectance over black in accordance with ASTM E903, which is calculated based on standard reference spectral irradiance ASTM G173, of at least 17%.

18. The composition of claim 17, wherein the composition exhibits at least one of the following: (a) CIELAB "L" masstone of 27 to 29, (b) "a" masstone of 0 to +1, and (c) "b" masstone of −1 to +0.5.

19. The composition of claim 18, wherein the composition exhibits at least two of (a), (b) and (c).

20. A method of preparing an infrared reflective copper oxide pigment, comprising:
   a. providing starting copper oxide particles that are at least 99% pure CuO and have the following characteristics:
     i. $D_{10}$ particle size of 0.4-1.2 microns,
     ii. $D_{50}$ particle size of 0.9-5.1 microns,
     iii. $D_{90}$ particle size of 2.0-22.2 microns,
     iv. span $\Delta D$ of 1.6-8.8,
     v. specific surface area of 22-39 $m^2/g$, and
     vi. crystallite size of 10-18 nanometers,
   b. heating the copper oxide particles at a temperature of 1100° F. to 1500° F., for a time of 20-120 minutes,
   c. milling the copper oxide particles sufficiently to achieve at least one characteristic selected from the group consisting of:
     i. $D_{10}$ particle size of 0.5-0.9 microns,
     ii. $D_{50}$ particle size of 0.8-1.5 microns,
     iii. $D_{90}$ particle size of 1.3-2.8 microns,
     iv. span $\Delta D$ of 0.9-1.4 and
     v. specific surface area of 3.0-4.5 $m^2/g$, and
     vi. crystallite size of 25-38.5 nanometers.

21. A copper oxide pigment having the following characteristics
   a. $D_{10}$ particle size of 0.3-2 microns,
   b. $D_{50}$ particle size of 0.6-3 microns,
   c. $D_{90}$ particle size of 0.9-5 microns,
   d. span $\Delta D$ of 0.7-3.0, and
   e. specific surface area of 2-10 $m^2/g$ and
   f. crystallite size of 19.6-42 nanometers.

22. A composition comprising the copper oxide pigment of claim 21.

* * * * *